United States Patent
Munzinger et al.

(10) Patent No.: US 11,866,544 B2
(45) Date of Patent: Jan. 9, 2024

(54) HEAT-CURING EPOXY RESIN COMPOSITION HAVING HIGH STORAGE STABILITY

(71) Applicant: SIKA TECHNOLOGY AG, Baar (CH)

(72) Inventors: Noah Munzinger, Zürich (CH); Christian Krüger, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 622 days.

(21) Appl. No.: 16/759,087

(22) PCT Filed: Oct. 24, 2018

(86) PCT No.: PCT/EP2018/079159
§ 371 (c)(1),
(2) Date: Apr. 24, 2020

(87) PCT Pub. No.: WO2019/081581
PCT Pub. Date: May 2, 2019

(65) Prior Publication Data
US 2020/0339737 A1   Oct. 29, 2020

(30) Foreign Application Priority Data

Oct. 24, 2017 (EP) ..................... 17198120

(51) Int. Cl.
| | | |
|---|---|---|
| *C09J 7/35* | (2018.01) | |
| *C08G 59/40* | (2006.01) | |
| *C08K 5/00* | (2006.01) | |
| *C08K 5/132* | (2006.01) | |
| *C08K 5/1515* | (2006.01) | |
| *C08K 5/17* | (2006.01) | |
| *C08K 5/21* | (2006.01) | |
| *C08L 9/00* | (2006.01) | |
| *C08L 75/04* | (2006.01) | |
| *C09J 163/00* | (2006.01) | |
| *C08K 5/07* | (2006.01) | |
| *C08G 59/24* | (2006.01) | |

(52) U.S. Cl.
CPC ....... *C08G 59/245* (2013.01); *C08G 59/4021* (2013.01); *C08K 5/0025* (2013.01); *C08K 5/07* (2013.01); *C08K 5/132* (2013.01); *C08K 5/1515* (2013.01); *C08K 5/17* (2013.01); *C08K 5/21* (2013.01); *C08L 9/00* (2013.01); *C08L 75/04* (2013.01); *C09J 7/35* (2018.01); *C09J 163/00* (2013.01); *C08L 2203/14* (2013.01); *C08L 2207/53* (2013.01)

(58) Field of Classification Search
CPC ........ C08L 63/00–10; C09D 163/00–10; C09J 163/00–10; C09J 7/35; C08K 5/07; C08K 5/06; C08G 59/4021
See application file for complete search history.

(56) References Cited

U.S. PATENT DOCUMENTS

| | | | | |
|---|---|---|---|---|
| 4,670,533 | A * | 6/1987 | Lauterbach | ........ C08G 59/4021 528/367 |
| 5,157,060 | A * | 10/1992 | Redman | ............... C08G 18/643 525/509 |
| 2001/0028953 | A1 * | 10/2001 | Bluem | .................. C09J 163/00 428/355 R |
| 2007/0096056 | A1 | 5/2007 | Takeuchi et al. | |
| 2009/0104448 | A1 * | 4/2009 | Thompson | .............. B32B 37/12 156/273.5 |

FOREIGN PATENT DOCUMENTS

| | | |
|---|---|---|
| CA | 2001300 C | 2/2001 |
| EP | 0 366 608 A2 | 5/1990 |
| EP | 0375874 A2 * | 7/1990 |
| EP | 2 060 592 A1 | 5/2009 |
| RU | 2478678 C2 * | 4/2013 |
| WO | 2009/133168 A1 | 11/2009 |

OTHER PUBLICATIONS

Apr. 28, 2020 International Preliminary Report on Patentability issued in International Patent Application No. PCT/EP2018/079159.
Nov. 21, 2018 International Search Report issued in International Patent Application No. PCT/EP2018/079159.

* cited by examiner

*Primary Examiner* — Kregg T Brooks
(74) *Attorney, Agent, or Firm* — Oliff PLC

(57) ABSTRACT

A one-component thermosetting epoxy resin compositions that feature good storage stability. The epoxy resin compositions are especially suitable for use as bodywork adhesive and for production of structural foams.

14 Claims, No Drawings

HEAT-CURING EPOXY RESIN COMPOSITION HAVING HIGH STORAGE STABILITY

TECHNICAL FIELD

The invention relates to the field of thermosetting epoxy resin compositions, especially for use as bodywork adhesive and for production of structural foams.

PRIOR ART

Thermosetting epoxy resin compositions have long been known. An important field of use of thermosetting epoxy resin compositions is in motor vehicle construction, especially in bonding or the foam-filling of voids in the bodywork. In both cases, after the application of the epoxy resin composition, the bodywork is heated in the cathodic electrocoating oven, as a result of which the thermosetting epoxy resin composition is cured and optionally foamed.

In order that curing is possible, heat-activatable curing agents for epoxy resins are used. However, these heat-activatable curing agents lead to problems with the storage stability of the thermosetting epoxy resin compositions. Especially in the case of additional use of accelerators for said curing agents, for example ureas, latent imidazoles and amine-boron trifluoride complexes, this problem is particularly marked. There is therefore a need for thermosetting epoxy resin compositions which on the one hand have high storage stability and nevertheless also have satisfactory mechanical properties.

SUMMARY OF THE INVENTION

It is therefore an object of the present invention to provide thermosetting epoxy resin compositions which on the one hand have high storage stability and nevertheless also have satisfactory mechanical properties.

This object was surprisingly achieved by a thermosetting epoxy resin composition as claimed in claim 1. This epoxy resin composition can be used particularly efficiently as a one-component thermosetting adhesive, especially as a thermosetting one-component bodywork adhesive in motor vehicle construction, and for production of a structural foam for the reinforcement of voids, especially in metallic structures.

Further aspects of the invention form the subject matter of further independent claims. Particularly preferred embodiments of the invention form the subject matter of the dependent claims.

WAYS OF EXECUTING THE INVENTION

The present invention relates to one-component thermosetting epoxy resin compositions comprising
a) at least one epoxy resin A having an average of more than one epoxy group per molecule;
b) at least one latent curing agent for epoxy resins B;
c) at least one compound of the formula

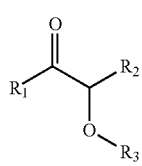

(III)

where the substituents $R_1$ and $R_2$ are independently an unsubstituted benzene, a halogenated benzene, alkoxylated benzene, an alkylated benzene or an N derivative of an aniline; and where the substituent $R_3$ is H or an alkyl group having 1 to 10 carbon atoms.

The weight ratio of the at least one epoxy resin A having an average of more than one epoxy group per molecule to the at least one compound of the formula (III) is 5-800.

In this document, the use of the term "independently" in connection with substituents, radicals or groups should be interpreted such that the substituents, radicals or groups having the same designation in the same molecule may occur simultaneously with different meanings.

In this document, a "toughness improver" is understood to mean an addition to an epoxy resin matrix that results in a distinct increase in toughness even in the case of small additions of ≥5% by weight, especially ≥10% by weight, based on the total weight of the epoxy resin compositions and is thus capable of absorbing higher flexural, tensile, impact or shock stress before the matrix cracks or breaks.

The prefix "poly" in substance names such as "polyol", "polyisocyanate", "polyether" or "polyamine" in the present document indicates that the respective substance, in a formal sense, contains more than one of the functional groups that occur in its name per molecule.

In the present document, "molecular weight" is understood to mean the molar mass (in grams per mole) of a molecule. "Average molecular weight" is understood to mean the number-average molecular weight $M_n$ of an oligomeric or polymeric mixture of molecules, which is typically determined by means of GPC against polystyrene as standard.

A "primary hydroxyl group" refers to an OH group bonded to a carbon atom having two hydrogens.

In the present document, the term "primary amino group" refers to an $NH_2$ group bonded to one organic radical, while the term "secondary amino group" refers to an NH group bonded to two organic radicals which may also together be part of a ring. Accordingly, an amine having one primary amino group is referred to as "primary amine", one having a secondary amino group correspondingly as "secondary amine", and one having a tertiary amino group as "tertiary amine".

In the present document, "room temperature" refers to a temperature of 23° C.

The epoxy resin A having an average of more than one epoxy group per molecule is preferably a liquid epoxy resin or a solid epoxy resin. The term "solid epoxy resin" is very familiar to the person skilled in the art of epoxies and is used by contrast with "liquid epoxy resins". The glass transition temperature of solid resins is above room temperature, meaning that they can be comminuted at room temperature to give free-flowing powders.

Preferred epoxy resins have the formula (II)

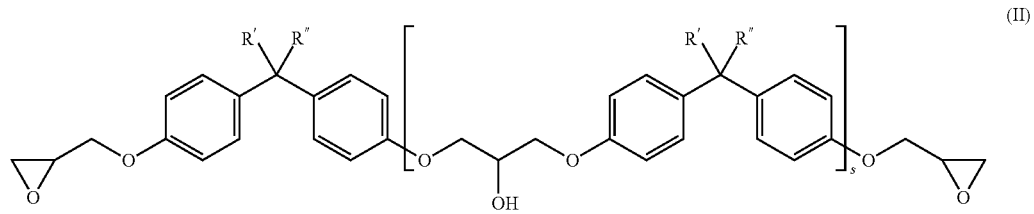

The substituents R' and R" here are independently either H or CH$_3$.

In solid epoxy resins, the index s has a value of >1.5, especially of 2 to 12.

Solid epoxy resins of this kind are commercially available, for example from Dow or Huntsman or Hexion.

Compounds of the formula (II) having an index s of 1 to 1.5 are referred to as semisolid epoxy resins by the person skilled in the art. For this present invention, they are likewise considered to be solid resins. However, preferred solid epoxy resins are epoxy resins in the narrower sense, i.e. where the index s has a value of >1.5.

In liquid epoxy resins, the index s has a value of less than 1. Preferably, s has a value of less than 0.2.

Preference is thus given to diglycidyl ethers of bisphenol A (DGEBA), of bisphenol F, and of bisphenol A/F. Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Hexion).

Further suitable epoxy resins A are what are called epoxy novolaks. These especially have the following formula:

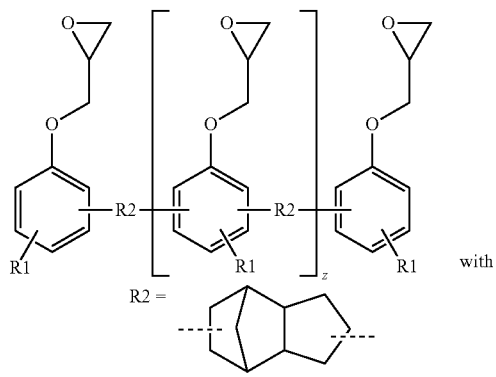

or CH$_2$, R1=H or methyl and z=0 to 7.

More particularly, these are phenol or cresol epoxy novolaks (R2=CH$_2$).

Such epoxy resins are commercially available under the EPN or ECN and Tactix® trade names from Huntsman or from the D.E.N.™ product series from Dow Chemical.

Preferably, the epoxy resin A is a liquid epoxy resin of the formula (II).

In a particularly preferred embodiment, the thermosetting epoxy resin composition contains both at least one liquid epoxy resin of the formula (II) with s<1, especially less than 0.2, and at least one solid epoxy resin of the formula (II) with s>1.5, especially from 2 to 12.

The proportion of the epoxy resin A is preferably 10-60% by weight, especially 30-50% by weight, based on the total weight of the epoxy resin composition.

It is further advantageous when 50-100% by weight, especially 80-100% by weight, of the epoxy resin A is an aforementioned liquid epoxy resin.

It is further advantageous when 0-30% by weight, especially 0-20% by weight, more preferably 5-15% by weight, of the epoxy resin A is an aforementioned solid epoxy resin.

The thermosetting epoxy resin composition contains at least one compound of the formula

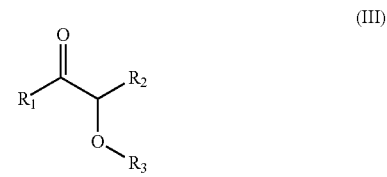

The substituents R$_1$ and R$_2$ here are independently an unsubstituted benzene, a halogenated benzene, alkoxylated benzene, an alkylated benzene or an N derivative of an aniline.

Preferably, the substituents R$_1$ and R$_2$ are independently an unsubstituted benzene; a halogenated benzene, especially a chlorinated benzene; an alkoxylated benzene, especially a C$_1$-C$_{10}$ alkoxylated benzene, especially a C$_1$-C$_4$ alkoxylated benzene; an alkylated benzene, especially a C$_1$-C$_{10}$ alkylated benzene, especially a C$_1$-C$_4$ alkylated benzene. Most preferably, the substituents R$_1$ and R$_2$ represent an unsubstituted benzene.

Preferably, the two substituents R$_1$=R$_2$.

The substituent R$_3$ is H or an alkyl group having 1 to 10 carbon atoms, especially H or an alkyl group having 1 to 8 carbon atoms, especially H or an alkyl group having 1 to 4 carbon atoms, especially preferably H.

Particular preference is given to a compound of the formula (III), where the substituents R$_1$ and R$_2$ are each unsubstituted benzene and the substituent R$_3$ is H or an alkyl group having 1 to 4 carbon atoms, especially preferably H.

The compound of the formula (III) is preferably selected from the list consisting of:

benzoin (α-hydroxy-α-phenylacetophenone, 2-hydroxy-1,2-diphenylethanone), 4-chlorobenzoin, 4,4'-dimethoxybenzoin, benzoin methyl ether, benzoin ethyl ether, benzoin isopropyl ether, benzoin isobutyl ether, 1,2-bis(4-dimethylaminophenyl)-2-hydroxyethanone and N-(4-{2-[4-(acetylamino)phenyl]-2-hydroxyacetyl}phenyl)acetamide, more preferably selected from the list consisting of:
benzoin, benzoin methyl ether, benzoin ethyl ether, benzoin isopropyl ether, and benzoin isobutyl ether,
most preferably benzoin.

Preferably, the proportion of the at least one compound of the formula (III) is 0.1% by weight-15% by weight, especially 0.5% by weight-10% by weight, especially 1% by weight-8% by weight, especially 1.5% by weight-5% by weight, especially preferably 1.5% by weight-3% by weight, based on the total weight of the one-component thermosetting epoxy resin composition. This is advantageous in that it leads to very good values in storage stability. This is apparent, for example, in tables 4 and 5 in examples 26 to 36.

In the one-component thermosetting epoxy resin composition, the weight ratio of the at least one epoxy resin A having an average of more than one epoxy group per molecule to the at least one compound of the formula (III) is 5-800.

Preferably, the weight ratio is 10-600, especially 10-400, 10-160, 10-100, 10-35, 15-35, more preferably 20-25. This is conducive to good storage stability and high tensile shear strength values. This is apparent, for example, in table 6 from examples 38 and 39.

It has further been found that, surprisingly, compositions having a weight ratio of 15-35, especially 20-25, lead to an improvement in impact peel strength at 23° C. This is apparent, for example, in the comparison of example 38 with example 37.

If the weight ratio is 5-40, especially 5-30, especially 5-25, especially 5-20, especially 8-20, this leads to very good values in storage stability. This is apparent, for example, in tables 4 and 5 in the comparison of examples 26 to 36.

The thermosetting epoxy resin composition contains at least one latent curing agent B for epoxy resins. This is activated by elevated temperature, preferably at temperatures of 70° C. or more.

This is preferably a curing agent selected from the group consisting of dicyandiamide; guanamines, especially benzoguanamine; guanidines; anhydrides of polybasic carboxylic acids, especially 1-methyl-5-norbornene-2,3-dicarboxylic anhydride; dihydrazides and aminoguanidines.

Preferably, the curing agent B is selected from the group consisting of guanidines, especially dicyandiamide; anhydrides of polybasic carboxylic acids, especially 1-methyl-5-norbornene-2,3-dicarboxylic anhydride, and dihydrazides.

More preferably, the curing agent B is selected from the group consisting of guanidines, especially dicyandiamide, and dihydrazides.

Especially preferred as curing agent B is dicyandiamide.

The amount of the latent curing agent B for epoxy resins is advantageously 0.1-30% by weight, especially 0.2-10% by weight, preferably 1-10% by weight, especially preferably 5-10% by weight, based on the weight of the epoxy resin A.

Preferably, the thermosetting epoxy resin composition additionally contains at least one accelerator C for epoxy resins. Such accelerating curing agents are preferably substituted ureas, for example 3-(3-chloro-4-methyl-phenyl)-1,1-dimethylurea (chlortoluron) or phenyldimethylureas, especially p-chlorophenyl-N,N-dimethylurea (monuron), 3-phenyl-1,1-dimethylurea (fenuron) or 3,4-dichlorophenyl-N,N-dimethylurea (diuron). In addition, it is possible to use compounds from the class of the imidazoles, such as 2-isopropylimidazole or 2-hydroxy-N-(2-(2-(2-hydroxyphenyl)-4,5-dihydro-imidazol-1-yl)ethyl)benzamide, imidazolines, trihalide complexes, preferably $BF_3$ complexes, blocked amines and encapsulated amines.

Preferably, the accelerator C for epoxy resins is selected from the list consisting of substituted ureas, imidazoles, imidazolines and blocked amines.

More preferably, the accelerator C for epoxy resins is selected from the list consisting of substituted ureas and blocked amines, especially when the latent curing agent B is a guanidine, especially dicyandiamide.

Most preferably, the latent curing agent B is a guanidine, especially dicyandiamide, and the one-component thermosetting epoxy resin composition additionally includes an accelerator C for epoxy resins, selected from the list consisting of substituted ureas and blocked amines, especially substituted ureas.

This is conducive to a significant improvement in storage stability, as apparent in examples 9-15 in table 2. It has been found that, surprisingly, compounds of the formula (III), especially in the presence of the aforementioned accelerators C for epoxy resins, lead to a major improvement in storage stability.

Preferably, the one-component thermosetting epoxy resin composition comprises an accelerator C for epoxy resins, selected from the list consisting of substituted ureas and blocked amines, and a latent curing agent B, which is a guanidine, especially dicyandiamide, and the weight ratio of the at least one epoxy resin A having an average of more than one epoxy group per molecule to the at least one compound of the formula (III) is 20-400, especially 25-160, more preferably 25-100. This is conducive to good storage stability. This is apparent, for example, in table 2 from examples 11-13. It has been found that, surprisingly, in cases with significant impairment of storage stability owing to the presence of accelerators, even a small amount of the compound of the formula (III) leads to a major improvement in storage stability.

Especially preferred as accelerator C are substituted ureas.

The amount of the accelerator C is advantageously 0.1-30% by weight, especially 0.2-10% by weight, preferably 1-10% by weight, especially preferably 5-10% by weight, based on the weight of the epoxy resin A.

Preferably, the weight ratio of the at least one latent curing agent for epoxy resins B to the at least one compound of the formula (III) is 0.5-8, especially 0.5-7, especially 0.5-3.5, especially 0.5-2.5, more preferably 0.5-1.8. This is advantageous in that this leads to very good values in storage stability. This is apparent, for example, in tables 4 and 5 in examples 26 to 36.

The one-component thermosetting epoxy resin composition preferably contains at least one toughness improver D. The toughness improvers D may be liquid or solid.

More particularly, the toughness improver D is selected from the group consisting of terminally blocked polyurethane polymers D1, liquid rubbers D2 and core-shell polymers D3. Preferably, the toughness improver D is selected from the group consisting of terminally blocked polyurethane polymers D1 and liquid rubbers D2. Particular preference is given to a terminally blocked polyurethane polymer D1.

If the toughness improver D is a terminally blocked polyurethane polymer D1, it is preferably a terminally blocked polyurethane prepolymer of the formula (I).

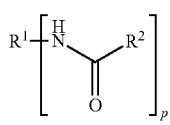

R¹ here is a p-valent radical of a linear or branched polyurethane prepolymer terminated by isocyanate groups after the removal of the terminal isocyanate groups, and p has a value of 2 to 8.

In addition, R² is independently a substituent selected from the group consisting of

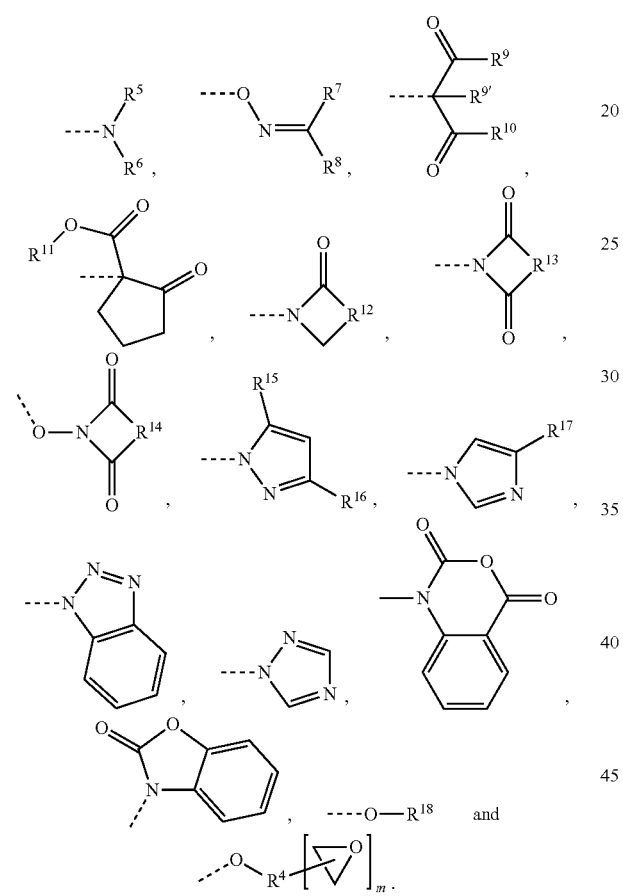

$R^5$, $R^6$, $R^7$ and $R^8$ here are each independently an alkyl or cycloalkyl or aralkyl or arylalkyl group, or $R^5$ together with $R^6$, or $R^7$ together with $R^8$, form part of a 4- to 7-membered, optionally substituted ring.

In addition, $R^{9'}$ and $R^{10}$ are each independently an alkyl or aralkyl or arylalkyl group or an alkyloxy or aryloxy or aralkyloxy group, and $R^{11}$ is an alkyl group.

$R^{12}$, $R^{13}$ and $R^{14}$ are each independently an alkylene group which has 2 to 5 carbon atoms and optionally has double bonds or is substituted, or a phenylene group or a hydrogenated phenylene group.

$R^{15}$, $R^{16}$ and $R^{17}$ are each independently H or an alkyl group or an aryl group or an aralkyl group, and $R^{18}$ is an aralkyl group or a mono- or polycyclic, substituted or unsubstituted aromatic group that optionally has aromatic hydroxyl groups.

Finally, $R^4$ is a radical of an aliphatic, cycloaliphatic, aromatic or araliphatic epoxide containing a primary or secondary hydroxyl group after the removal of the hydroxyl and epoxy groups, and m has a value of 1, 2 or 3.

$R^{18}$ is especially considered to be firstly phenols or polyphenols, especially bisphenols, after removal of a hydroxyl group. Preferred examples of such phenols and bisphenols are especially phenol, cresol, resorcinol, catechol, cardanol (3-pentadecenylphenol (from cashew nutshell oil)), nonylphenol, phenols that have been reacted with styrene or dicyclopentadiene, bisphenol A, bisphenol F and 2,2'-diallylbisphenol A. $R^{18}$ is secondly considered to be especially hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this is especially a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is especially a methylene-bonded aromatic group, especially a benzyl group.

If $R^5$, $R^6$, $R^7$, $R^8$, $R^9$, $R^{9'}$ or $R^{10}$ is an alkylaryl group, this is especially a phenylene-bonded $C_1$- to $C_{20}$-alkyl group, for example tolyl or xylyl.

The $R^2$ radicals are preferably the substituents of the formulae

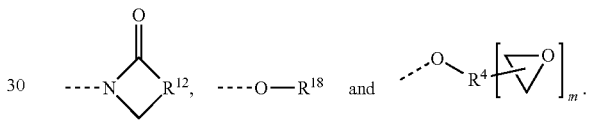

A preferred substituent of the formula

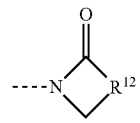

is ε-caprolactam after removal of the NH proton.

Preferred substituents of the formula —O—$R^{18}$ are monophenols or polyphenols, especially bisphenols, after removal of a phenolic hydrogen atom. Particularly preferred examples of such $R^2$ radicals are radicals selected from the group consisting of

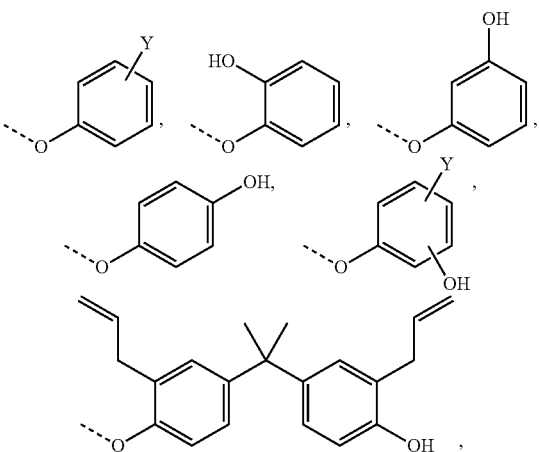

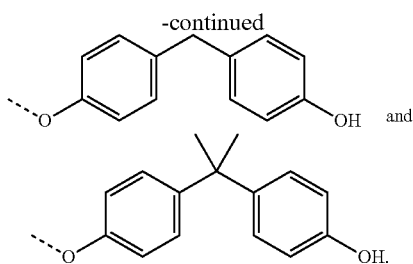

The Y radical here is a saturated, aromatic or olefinically unsaturated hydrocarbyl radical having 1 to 20 carbon atoms, especially having 1 to 15 carbon atoms. Preferred Y are especially allyl, methyl, nonyl, dodecyl, phenyl, alkyl ether, carboxylic ester or an unsaturated $C_{15}$-alkyl radical having 1 to 3 double bonds.

Most preferably, $R^2$ is —O—$R^{18}$.

The terminally blocked polyurethane prepolymer of the formula (I) is prepared from the linear or branched polyurethane prepolymer terminated by isocyanate groups with one or more isocyanate-reactive compounds $R^2H$. If two or more such isocyanate-reactive compounds are used, the reaction can be effected sequentially or with a mixture of these compounds.

The reaction is preferably effected in such a way that the one or more isocyanate-reactive compounds $R^2H$ are used stoichiometrically or in a stoichiometric excess in order to ensure that all NCO groups have been converted.

The polyurethane prepolymer with isocyanate end groups on which $R^1$ is based can be prepared from at least one diisocyanate or triisocyanate and from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the previous paragraph. It is of course also possible to use suitable mixtures of di- or triisocyanates.

Especially suitable polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, especially of 600-4000, preferably of 700-2200, g/equivalent of NCO-reactive groups.

Preferred polymers $Q_{PM}$ are polyols having average molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxy polyalkylene glycols having $C_2$-$C_6$-alkylene groups or having mixed $C_2$-$C_6$-alkylene groups, terminated by amino, thiol or, preferably, hydroxyl groups. Particular preference is given to polypropylene glycols or polybutylene glycols. Particular preference is further given to hydroxyl group-terminated polyoxybutylenes.

Especially suitable polyphenols $Q_{PP}$ are bis-, tris- and tetraphenols. This is understood to mean not just straight phenols but optionally also substituted phenols. The nature of the substitution may be very varied. More particularly, this is understood to mean substitution directly on the aromatic ring to which the phenolic OH group is bonded. Phenols are additionally understood to mean not just monocyclic aromatics but also polycyclic or fused aromatics or heteroaromatics that have the phenolic OH group directly on the aromatic or heteroaromatic system.

In a preferred embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethane, especially by using the diisocyanate or triisocyanate in a stoichiometric excess in relation to the amino, thiol or hydroxyl groups of the polymer $Q_{PM}$.

The polyurethane prepolymer having isocyanate end groups preferably has elastic character. It preferably exhibits a glass transition temperature Tg of less than 0° C.

The toughness improver D may be a liquid rubber D2. This may be, for example, a carboxyl- or epoxy-terminated polymer.

In a first embodiment, this liquid rubber may be a carboxyl- or epoxy-terminated acrylonitrile/butadiene copolymer or a derivative thereof. Such liquid rubbers are commercially available, for example, under the Hypro/Hypox® CTBN name and CTBNX and ETBN from Emerald Performance Materials. Suitable derivatives are especially elastomer-modified prepolymers having epoxy groups, as sold commercially under the Polydis® product line, especially from the Polydis® 36. product line, by Struktol® (Schill+ Seilacher Gruppe, Germany) or under the Albipox product line (Evonik, Germany).

In a second embodiment, this liquid rubber may be a polyacrylate liquid rubber which is fully miscible with liquid epoxy resins and does not separate to form microdroplets until the epoxy resin matrix is cured. Such polyacrylate liquid rubbers are available, for example, under the 20208-XPA name from Dow.

It is of course also possible to use mixtures of liquid rubbers, especially mixtures of carboxyl- or epoxy-terminated acrylonitrile/butadiene copolymers or of derivatives thereof.

In a third embodiment, the toughness improver D may be a core-shell polymer D3. Core-shell polymers consist of an elastic core polymer and a rigid shell polymer. Particularly suitable core-shell polymers consist of a core of elastic acrylate or butadiene polymer encased by a rigid shell of a rigid thermoplastic polymer. This core-shell structure either forms spontaneously as a result of separation of a block copolymer or is defined by the conduct of the polymerization as a latex or suspension polymerization with subsequent grafting. Preferred core-shell polymers are what are called MBS polymers, which are commercially available under the Clearstrength™ trade name from Arkema, Paraloid™ from Dow or F-351™ from Zeon.

Preferably, the proportion of toughness improver D is 5-50% by weight, 10-40% by weight, 15-30% by weight, more preferably 20-30% by weight, based on the total weight of the epoxy resin composition.

In a further preferred embodiment, the composition additionally comprises at least one filler F. Preference is given here to mica, talc, kaolin, wollastonite, feldspar, syenite, chlorite, bentonite, montmorillonite, calcium carbonate (precipitated or ground), dolomite, quartz, silicas (fused or precipitated), cristobalite, calcium oxide, aluminum hydroxide, magnesium oxide, hollow ceramic beads, hollow glass beads, hollow organic beads, glass beads, color pigments.

Particular preference is given to fillers selected from the group consisting of wollastonite, calcium carbonate, color pigments, especially carbon black, and fumed silicas.

Particular preference is given to fillers selected from the group consisting of color pigments, especially carbon black, and fumed silicas.

The fillers are most preferably fumed silicas.

The effect of the fillers F on the improvement in storage stability is apparent in examples 16-25 in table 3. It has been found that, surprisingly, compounds of the formula (III) lead to a major improvement in storage stability especially in the presence of color pigments, especially carbon black, and fumed silica.

Advantageously, the total proportion of the overall filler F is 5-40% by weight, preferably 10-30% by weight, based on the total weight of the epoxy resin composition.

In a further preferred embodiment, the composition may comprise a physical or chemical blowing agent as obtainable, for example, under the Expancel™ trade name from Akzo Nobel or Celogen™ from Chemtura or under the Luvopor® trade name from Lehmann & Voss. The proportion of the blowing agent is advantageously 0.1-3% by weight, based on the total weight of the epoxy resin composition.

In a further preferred embodiment, the composition additionally comprises at least one epoxy-bearing reactive diluent G. Such reactive diluents are known to those skilled in the art. Preferred examples of epoxy-bearing reactive diluents are:

glycidyl ethers of monofunctional saturated or unsaturated, branched or unbranched, cyclic or open-chain $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether etc.;

glycidyl ethers of difunctional saturated or unsaturated, branched or unbranched, cyclic or open-chain $C_2$-$C_{30}$ alcohols, for example ethylene glycol glycidyl ether, butanediol glycidyl ether, hexanediol glycidyl ether, octanediol glycidyl ether, cyclohexanedimethanol diglycidyl ether, neopentyl glycol diglycidyl ether etc.;

glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylolpropane etc.;

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashew nutshell oil), N,N-diglycidylaniline, etc.;

epoxidized amines such as N,N-diglycidylcyclohexylamine etc.;

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids etc.;

epoxidized di- or trifunctional, low to high molecular weight polyether polyols, such as polyethylene glycol diglycidyl ether, polypropylene glycol diglycidyl ether etc.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the epoxy-bearing reactive diluent G is 0.1-15% by weight, preferably 0.1-5% by weight, especially preferably 0.1-2% by weight, more preferably 0.2-1% by weight, based on the total weight of the epoxy resin composition.

The composition may include further constituents, especially catalysts, stabilizers, especially heat and/or light stabilizers, thixotropic agents, plasticizers, solvents, mineral or organic fillers, blowing agents, dyes and pigments, anticorrosives, surfactants, defoamers and adhesion promoters.

Suitable plasticizers are especially phenol alkylsulfonates or N-butylbenzamide, as commercially available as Mesamoll® or Dellatol BBS from Bayer.

Suitable stabilizers are specially optionally substituted phenols such as BHT or Wingstay® T (Elikem), sterically hindered amines or N-oxyl compounds such as TEMPO (Evonik).

A particularly preferred one-component epoxy resin composition comprises:

10-60% by weight, especially 30-50% by weight, based on the total weight of the epoxy resin composition, of epoxy resin A having an average of more than one epoxy group per molecule; preferably 50-100% by weight, especially 80-100% by weight, of the epoxy resin A is a liquid epoxy resin and 0-30% by weight, especially 0-20% by weight, more preferably 5-15% by weight, of the epoxy resin A is a solid epoxy resin;

at least one latent curing agent for epoxy resins B, preferably selected from dicyandiamide, guanamines, guanidines, anhydrides of polybasic carboxylic acids, dihydrazides, and aminoguanidines, and derivatives thereof, preference being given to dicyandiamide;

preferably at least one accelerator C selected from the list consisting of substituted ureas, imidazoles, imidazolines and blocked amines, especially selected from the list consisting of substituted ureas and blocked amines, especially preferably substituted ureas;

at least one toughness improver D is selected from the group consisting of terminally blocked polyurethane polymers D1, liquid rubbers D2 and core-shell polymers D3; the proportion of toughness improver D preferably is 5-50% by weight, 10-40% by weight, 15-30% by weight, more preferably 20-30% by weight, based on the total weight of the epoxy resin composition;

preferably 5-40% by weight, preferably 10-30% by weight, based on the total weight of the epoxy resin composition, of a filler F preferably selected from the group consisting of wollastonite, calcium carbonate, color pigments, especially carbon black, and fumed silicas, especially color pigments, especially carbon black, and fumed silicas, more preferably fumed silicas;

preferably 0.1-15% by weight, preferably 0.1-5% by weight, especially preferably 0.1-2% by weight, more preferably 0.2-1% by weight, based on the total weight of the epoxy resin composition, of an epoxy-bearing reactive diluent G;

where
the weight ratio of the at least one epoxy resin A having an average of more than one epoxy group per molecule to the at least one compound of the formula (III) is 10-600, especially 10-400, 10-160, 10-100, 10-35, 15-35, more preferably 20-25.

It may further be advantageous when the preferred one-component epoxy resin composition consists of the aforementioned constituents to an extent of more than 80% by weight, preferably more than 90% by weight, especially more than 95% by weight, especially preferably more than 98% by weight, most preferably more than 99% by weight, based on the total weight of the epoxy resin composition.

An example of a particularly preferred composition is, for example, example 38 in table 6.

It may further be advantageous when the compositions of the invention include less than 2% by weight, especially less than 1% by weight, preferably less than 0.5% by weight, more preferably less than 0.3% by weight, most preferably less than 0.1% by weight, of thermal polymerization initiators, especially organic peroxides and azo compounds, based on the total weight of the epoxy resin composition.

It may further be advantageous when the compositions of the invention include less than 5% by weight, especially less than 1% by weight, preferably less than 0.5% by weight, more preferably less than 0.3% by weight, most preferably less than 0.1% by weight, of (meth)acrylate compounds, especially acrylate monomers, methacrylate monomers and polyacrylate polymers, based on the total weight of the epoxy resin composition.

It may further be advantageous when the compositions of the invention include less than 2% by weight, especially less than 1% by weight, preferably less than 0.5% by weight, more preferably less than 0.3% by weight, most preferably less than 0.1% by weight, of photolytic polymerization initiators, based on the total weight of the epoxy resin composition.

These photolytic polymerization initiators are selected from the list consisting of aromatic sulfonyl chlorides; photoactive oximes; acetophenones, such as acetophenone, 2,2-dimethoxy-2-phenylacetophenone, 1,1-dichloroacetophenone and 4-(1-t-butyldioxy-1-methylethyl)acetophenone; anthraquinones, such as 2-methylanthraquinone, 2-amylanthraquinone, 2-t-butylanthraquinone and 1-chloro-anthraquinone; thioxanthones, such as 2,4-dimethylthioxanthone, 2,4-diisopro-pylthioxanthone and 2-chlorothioxanthone; ketals, such as acetophenone dimethyl ketal and benzyl dimethyl ketal, benzophenones, such as benzophenone, 4-(1-t-butyl-dioxy-1-methylethyl)benzophenone, 3,3',4,4'-tetrakis(t-butyldioxycarbonyl)-benzophenone, 2-methyl-1-[(4-methylthio)phenyl]-2-morpholinopropan-1-one and 2-benzyl-2-dimethylamino-1-(4-morpholinophenyl)butanone-1, acylphosphine oxides and xanthones.

It is advantageous when the epoxy resin composition of the invention has a viscosity at 25° C. of 500-3000 Pa*s, especially 1000-2500 Pa*s, preferably 1000-2000 Pa*s. This is advantageous in that this assures good applicability. Preferably, the viscosity is measured as described in the examples.

It is also advantageous when, in the epoxy resin composition of the invention, the viscosity measured at a measurement temperature of 25° C., after storage for 1 week at 60° C. one day after production, rises by less than 200%, less than 150%, less than 120%, less than 100%, less than 50%.

Particular preference is given to thermosetting epoxy resin compositions having, in the cured state:

- a tensile shear strength, especially measured to DIN EN 1465, more preferably as described in the examples, of more than 10 MPa, more than 15 MPa, more than 20 MPa, and/or
- a tensile strength, especially measured to DIN EN ISO 527, more preferably as described in the examples, of more than 10 MPa, more than 15 MPa, more than 20 MPa, and/or
- an elongation at break, especially measured to DIN EN ISO 527, more preferably as described in the examples, of 1-30%, 2-20%, 3-10%, and/or
- a modulus of elasticity, especially measured to DIN EN ISO 527, more preferably as described in the examples, of 300-2000 MPa, preferably 1000-2000 MPa.

The thermosetting epoxy resin composition of the invention is preferably not capable of curing by means of free-radical polymerization reactions, especially free-radical polymerization reactions induced by UV/light or free-radical polymerization reactions induced by heat.

It has been found that the thermosetting epoxy resin compositions described are particularly suitable for use as one-component thermosetting adhesives, especially as thermosetting one-component adhesive in motor vehicle construction and sandwich panel construction. Such a one-component adhesive has a range of possible uses. More particularly, thermosetting one-component adhesives that feature high impact resistance, both at higher temperatures and at low temperatures, are achievable thereby. Such adhesives are required for the bonding of heat-stable materials. Heat-stable materials are understood to mean materials that are dimensionally stable at least during the curing time at a curing temperature of 100-220° C., preferably 120-200° C., at least during the curing time. More particularly, these are metals and plastics such as ABS, polyamide, polyphenylene ether, composite materials such as SMC, unsaturated polyesters GFR, epoxy or acrylate composite materials. Preference is given to the use in which at least one material is a metal. A particularly preferred use is considered to be the bonding of identical or different metals, especially in bodywork construction in the automobile industry. The preferred metals are in particular steel, especially electrolytically galvanized, hot dip-galvanized, oiled steel, Bonazinc-coated steel, and subsequently phosphated steel, and also aluminum, especially in the variants that typically occur in automobile construction.

Such an adhesive is especially contacted first with the materials to be bonded at a temperature of between 10° C. and 80° C., especially between 10° C. and 60° C., and later cured at a temperature of typically 100-220° C., preferably 120-200° C.

A further aspect of the present invention relates to a method of bonding heat-stable substrates, comprising the steps of:
i) applying a thermosetting epoxy resin composition as described in detail above to the surface of a heat-stable substrate S1, especially of a metal;
ii) contacting the thermosetting epoxy resin composition applied with the surface of a further heat-stable substrate S2, especially of a metal;
iii) heating the composition to a temperature of 100-220° C., especially of 120-200° C.

The substrate S2 here consists of the same material as or a different material than the substrate S1.

The substrates S1 and/or S2 are especially the aforementioned metals and plastics.

Preferably, in step iii) heating the composition to a temperature of 100-220° C., especially of 120-200° C., the composition is left at the aforementioned temperature for 10 min-6 h, 10 min-2 h, 10 min-60 min, 20 min-60 min.

Preferably, the method does not include any step comprising a free-radical polymerization of the thermosetting epoxy resin composition. Preferably, the method does not include any step of free-radical polymerization reaction induced by UV/light or free-radical polymerization reactions induced by heat.

Such a method of bonding heat-stable materials results in an adhesive-bonded article. Such an article is preferably a motor vehicle or part of a motor vehicle.

A further aspect of the present invention is therefore an adhesive-bonded article obtained from the aforementioned method. It is of course possible to use a composition of the invention to realize not only thermosetting adhesives but also sealing compounds. In addition, the compositions of the invention are suitable not just for automobile construction but also for other fields of use. Particular mention should be made of related applications in the transportation sector such as ships, trucks, buses or rail vehicles, or in the construction of consumer goods, for example washing machines.

The materials adhesive-bonded by means of a composition of the invention are used at temperatures between typically 120° C. and −40° C., preferably between 100° C. and −40° C., especially between 80° C. and −40° C.

A particularly preferred use of the thermosetting epoxy resin composition of the invention is the use thereof as a thermosetting one-component bodywork adhesive in motor vehicle construction or as a stiffening compound or as a foamable, thermosetting composition for the reinforcement of voids in structural components and reinforcing elements.

A further aspect of the present invention relates to a cured epoxy resin composition as obtained by heating a thermosetting epoxy resin composition as described in detail above. The heating is typically effected in an oven at a temperature of 100-220° C., preferably between 120 and 200° C., preferably for 10 min-6 h, 10 min-2 h, 10 min-60 min, 20 min-60 min, at the aforementioned temperature.

The invention further encompasses the use of at least one compound of the formula (III) as described above for increasing the storage stability of a one-component thermosetting epoxy resin composition, especially a thermosetting epoxy adhesive, preferably in motor vehicle construction and sandwich panel construction. Preference is given to a thermosetting epoxy resin composition as described above.

The increase in the storage stability is based on the comparison with one-component thermosetting epoxy resin compositions that do not contain any of the aforementioned compound of the formula (III).

Storage stability is preferably determined by viscosity measurements of the one-component thermosetting epoxy resin composition, especially on the basis of the determination of the percentage rise in viscosity that arises after storage.

The percentage rise in viscosity is preferably that after storage at 60° C. for 1 week; more particularly, the viscosity measurements are conducted before and after storage, at a temperature of 25° C. in each case.

More preferably, the percentage rise in viscosity that arises after storage is determined as follows. The starting viscosity is determined one day after production of the one-component thermosetting epoxy resin composition on an MCR 302 rheometer from Anton Paar by oscillation using a plate-plate geometry at a temperature of 25° C. with the following parameters: 5 Hz, 1 mm gap, plate diameter 25 mm, 1% deformation.

The storage stability of the adhesives is assessed by repeating the viscosity measurement after storage at 60° C. for 1 week and ascertaining the percentage rise in viscosity that arises after the storage. The viscosity measurements before and after the storage are each conducted at a temperature of 25° C.

Preferably, the type and amount used of the at least one compound of the formula (III) correspond to the type and amount described above; more particularly, the types and amounts designated as preferred above are also used with preference.

Preferably:

the weight ratio of the at least one epoxy resin A having an average of more than one epoxy group per molecule to the at least one compound of the formula (III);

the weight ratio of the at least one latent curing agent for epoxy resins B to the at least one compound of the formula (III);

the proportion of the at least one compound of the formula (III), based on the total weight of the one-component thermosetting epoxy resin composition;

have the values designated as preferred above in relation to the one-component thermosetting epoxy resin composition of the invention.

Preference is further given to the use of the at least one compound of the formula (III) especially in one-component thermosetting epoxy resin compositions in which the latent curing agent B is a guanidine, especially dicyandiamide, and the accelerator C for epoxy resins is selected from the list consisting of substituted ureas and blocked amines, especially substituted ureas.

Preferably, in the use of the invention, the percentage rise in viscosity that arises after storage at 60° C. for 1 week, compared to a one-component thermosetting epoxy resin composition that does not contain any of the aforementioned compound of the formula (III), is less than 20%, less than 30%, especially less than 40%, less than 50%, especially preferably less than 75%, more preferably less than 90%, of the percentage rise in viscosity of a one-component thermosetting epoxy resin composition that does not contain any of the aforementioned compound of the formula (III).

EXAMPLES

Some examples that further illustrate the invention are cited hereinafter, but are not intended to restrict the scope of the invention in any way.

Preparation of a Toughness Improver ("D-1")

150 g of poly-THF 2000 (OH number 57 mg/g KOH) and 150 g of PolyBD R45V (OH number 46 mg/g KOH) were dried under reduced pressure at 105° C. for 30 minutes. Once the temperature had been reduced to 90° C., 61.5 g of IPDI and 0.14 g of dibutyltin dilaurate were added. The reaction was conducted under reduced pressure at 90° C. until the NCO content was constant at 3.10% after 2.0 h (calculated NCO content: 3.15%). Subsequently, 96.1 g of cardanol were added as blocking agent. Stirring was continued at 105° C. under reduced pressure until it was no longer possible to detect any free NCO. The product was used as such as toughness improver D-1.

| | |
|---|---|
| A resin liquid | liquid epoxy resin, D.E.R. 331 (bisphenol A diglycidyl ether), Dow |
| Reactive diluent | Hexanediol glycidyl ether, Denacol EX-212, Nagase America |
| B-1 | Dicyandiamide (="Dicy") |
| B-2 | Dihydrazide, MAI, Otsuka Chemicals Co., Japan |
| B-3 | Guanamine, benzoguanamine, AlzChem |
| B-4 | Anhydride, 1-methyl-5-norbornene-2,3-dicarboxylic anhydride, Aradur HY 906, Huntsman |
| C-1 | Substituted urea |
| C-2 | Blocked amine, amine/epoxy adduct, Ancamine 2014 FG, Evonik |
| F-1 | Fumed silica, Aerosil ® R202, Evonik |
| F-2 | Sheet silicate, Garamite 1958, BYK |
| F-3 | Calcium carbonate, Omyacarb ®, Omya |
| F-4 | Wollastonite, Nyglos 4W, Imerys |
| F-5 | Carbon black, Monarch, Cabot |
| Benzoin | Benzoin, Sigma Aldrich |
| | Poly-THF 2000 (difunctional polybutylene glycol) (OH equivalent weight = about 1000 g/OH equivalent), BASF |
| | PolyBD R45V (hydroxyl-terminated polybutadiene) (OH equivalent weight = about 1230 g/OH equivalent), Cray Valley |
| | Isophorone diisocyanate (="IPDI"), Evonik |
| | Cardolite NC-700 (cardanol, meta-substituted alkenylmonophenol), Cardolite |

Raw materials used.

Production of the Compositions

According to the details in tables 1-6, the compositions 1-39 were produced.

Test Methods

Tensile Strength (ZF), Elongation at Break and Modulus of Elasticity (DIN EN ISO 527)

An adhesive sample was pressed between two Teflon papers to a layer thickness of 2 mm. After curing at 175° C. for 35 min, the Teflon papers were removed and the specimens were die-cut to the DIN standard. The test specimens were examined under standard climatic conditions at a strain rate of 2 mm/min. Tensile strength (TS), elongation at break and the 0.05-0.25% modulus of elasticity were measured to DIN EN ISO 527.

Tensile Shear Strength (TSS) (DIN EN 1465)

Cleaned test specimens of Elo H420 steel (thickness 1.2 mm) that had been reoiled with Anticorit PL 3802-39S were bonded over a bonding area of 25×10 mm to the adhesive with glass beads as spacer in a layer thickness of 0.3 mm, and cured at oven temperature 140° C. for 10 min. A temperature probe was secured to the surface of each test specimen (substrate surface). The attainment of the temperature specified, accurately to 1° C., was the start of the measurement of the curing time in each case.

Tensile shear strength was determined on a tensile testing machine at a strain rate of 10 mm/min in a triplicate determination to DIN EN 1465.

Impact Peel Strength (I-Peel) (to ISO 11343)

The specimens were produced with the adhesive and DC04+ZE steel with dimensions of 90×20×0.8 mm. The bonding area here was 20×60 mm at a layer thickness of 0.3 mm with glass beads as spacer. The samples were cured at oven temperature 140° C. for 10 min. A temperature probe was secured to the surface of each test specimen (substrate surface). The attainment of the temperature specified, accurately to 1° C., was the start of the measurement of the curing time in each case.

Impact peel strength was measured in each case at the temperatures specified (23° C., −30° C.) as a triple determination on a Zwick 450 impact pendulum. The impact peel strength reported is the average force in N/mm under the measurement curve from 25% to 90% to ISO11343.

T-Peel Strength (DIN 53281)

130×25 mm test sheets of DC-04+ZE steel (thickness 0.8 mm) were prepared. Test sheets were processed at a height of 30 mm with a suitable die-cutting machine (90°). The cleaned 100×25 mm surfaces that had been reoiled with Anticorit PL 3802-39S were bonded to the adhesive with glass beads as spacer in a layer thickness of 0.3 mm, and cured at oven temperature 140° C. for 10 min. A temperature probe was secured to the surface of each test specimen (substrate surface). The attainment of the temperature specified, accurately to 1° C., was the start of the measurement of the curing time in each case. T-peel strength was determined on a tensile testing machine at a strain rate of 100 mm/min in a triplicate determination as peel force in N/mm in the traversed distance range from ⅙ to ⅚ of the distance covered.

Viscosity/Storage Stability of Adhesives

Viscosity measurements of the adhesives were effected one day after production on an Anton Paar MCR 302 rheometer by oscillation using a plate-plate geometry at a temperature of 25° C. or 50° C. with the following parameters: 5 Hz, 1 mm gap, plate diameter 25 mm, 1% deformation.

For assessment of the storage stability of the adhesives, the viscosity measurement was repeated after storage at the specified temperature (60° C.) for a specified time in days (d) or weeks (w), and the percentage rise in viscosity that results after the storage was ascertained.

In the tables, "A-resin/benzoin" describes the weight ratio of the epoxy resin A (A-resin liquid) to the at least one compound of the formula (III) (benzoin). "Curing agent/benzoin" describes the weight ratio of the latent curing agent for epoxy resins B to the at least one compound of the formula (III) (benzoin). "% by wt. of benzoin" describes the proportion of the at least one compound of the formula (III) (benzoin), based on the total weight of the one-component thermosetting epoxy resin composition.

TABLE 1

| | 1 pts. by wt. | 2 pts. by wt. | 3 pts. by wt. | 4 pts. by wt. | 5 pts. by wt. | 6 pts. by wt. | 7 pts. by wt. | 8 pts. by wt. |
|---|---|---|---|---|---|---|---|---|
| A-resin liquid | 80 | 80 | 80 | 80 | 80 | 80 | 80 | 80 |
| F-1 | 7 | 7 | 7 | 7 | 7 | 7 | 7 | 7 |
| B-1 | 6.6 | 6.6 | | | | | | |
| B-2 | | | 6.6 | 6.6 | | | | |

TABLE 1-continued

|  | 1 pts. by wt. | 2 pts. by wt. | 3 pts. by wt. | 4 pts. by wt. | 5 pts. by wt. | 6 pts. by wt. | 7 pts. by wt. | 8 pts. by wt. |
| --- | --- | --- | --- | --- | --- | --- | --- | --- |
| B-3 |  |  |  |  | 20.2 | 20.2 |  |  |
| B-4 |  |  |  |  |  |  | 30.8 | 30.8 |
| Benzoin | 0 | 4 | 0 | 4 | 0 | 4 | 0 | 4 |
| Total | 93.6 | 97.6 | 93.6 | 97.6 | 93.6 | 111.2 | 93.6 | 121.8 |
| A-resin/benzoin | — | 20.0 | — | 20.0 | — | 20.0 | — | 20.0 |
| Curing agent/benzoin |  | 1.7 |  | 1.7 |  | 5.1 |  | 7.7 |
| % by wt. of benzoin | — | 4.1 | — | 4.1 | — | 3.6 | — | 3.3 |
| 1 W 60° C. (%) | 11 | 0 | 22 | 0 | 30 | 8 | 23 | 1 |

TABLE 2

|  | 9 pts. by wt. | 10 pts. by wt. | 11 pts. by wt. | 12 pts. by wt. | 13 pts. by wt. | 14 pts. by wt. | 15 pts. by wt. |
| --- | --- | --- | --- | --- | --- | --- | --- |
| A-resin liquid | 80 | 80 | 80 | 80 | 80 | 80 | 80 |
| F-1 | 7 | 7 | 7 | 7 | 7 | 7 | 7 |
| B-1 | 6.6 | 6.6 | 6.6 | 6.6 | 6.6 | 6.6 | 6.6 |
| C-1 |  |  |  | 0.4 | 0.4 | 0.4 |  |
| C-2 |  |  |  |  |  | 7.4 | 7.4 |
| Benzoin | 0 | 4 | 0 | 1 | 4 | 0 | 4 |
| Total | 93.6 | 97.6 | 94 | 95 | 98 | 101 | 105 |
| A-resin/benzoin | — | 20.0 | — | 80.0 | 20.0 | — | 20.0 |
| Curing agent/benzoin | — | 1.7 | — | 6.6 | 1.7 | — | 1.7 |
| % by wt. of benzoin | — | 4.1 | — | 1.1 | 4.1 | — | 3.8 |
| 1 W 60 C. (%) | 11 | 0 | 8686 | 544 | 407 | n.d. | n.d. |
| 1 d 60° C. (%) | n.d. | n.d. | n.d. | n.d. | n.d. | 24 | 0 | n.d. = not determined

TABLE 3

|  | 16 pts. by wt. | 17 pts. by wt. | 18 pts. by wt. | 19 pts. by wt. | 20 pts. by wt. | 21 pts. by wt. | 22 pts. by wt. | 23 pts. by wt. | 24 pts. by wt. | 25 pts. by wt. |
| --- | --- | --- | --- | --- | --- | --- | --- | --- | --- | --- |
| A-resin liquid | 80 | 80 | 80 | 80 | 80 | 80 | 80 | 80 | 80 | 80 |
| F-1 | 7 | 7 |  |  |  |  |  |  |  |  |
| F-2 |  |  | 5 | 5 |  |  |  |  |  |  |
| F-3 |  |  |  |  | 40 | 40 |  |  |  |  |
| F-4 |  |  |  |  |  |  | 10 | 10 |  |  |
| F-5 |  |  |  |  |  |  |  |  | 10 | 10 |
| B-1 | 6.6 | 6.6 | 6.6 | 6.6 | 6.6 | 6.6 | 6.6 | 6.6 | 6.6 | 6.6 |
| Benzoin | 0 | 4 | 0 | 4 | 0 | 4 | 0 | 4 | 0 | 4 |
| A-resin/benzoin | 0 | 20.0 | 0 | 20.0 | 0 | 20.0 | 0 | 20.0 | 0 | 20.0 |
| Curing agent/benzoin | — | 1.7 | — | 1.7 | — | 1.7 | — | 1.7 | — | 1.7 |
| 1 W 60° C. (%) | 11 | 0 | 4854 | 1219 | n.d. | n.d. | n.d. | n.d. | n.d. | n.d. |
| 2 W 60° C. (%) | n.d. | n.d. | n.d. | n.d. | 75 | 25 | 30 | 11 | 37 | 5 | n.d. = not determined

TABLE 4

|  | 26 pts. by wt. | 27 pts. by wt. | 28 pts. by wt. | 29 pts. by wt. | 30 pts. by wt. | 31 pts. by wt. |
| --- | --- | --- | --- | --- | --- | --- |
| A-resin liquid | 80 | 80 | 80 | 80 | 80 | 80 |
| F-1 | 7 | 7 | 7 | 7 | 7 | 7 |
| B-1 | 5.6 | 5.6 | 6.6 | 6.6 | 6.6 | 6.6 |
| Benzoin | 0 | 4 | 0 | 1 | 2 | 4 |
| Total | 92.6 | 96.6 | 93.6 | 94.6 | 95.6 | 97.6 |

TABLE 4-continued

|  | 26 pts. by wt. | 27 pts. by wt. | 28 pts. by wt. | 29 pts. by wt. | 30 pts. by wt. | 31 pts. by wt. |
|---|---|---|---|---|---|---|
| A-resin/benzoin | — | 20.0 | — | 80.0 | 40.0 | 20.0 |
| Curing agent/benzoin | — | 1.4 | — | 6.6 | 3.3 | 1.7 |
| % by wt. of benzoin | — | 4.1 | — | 1.1 | 2.1 | 4.1 |
| 1 W 60° C. (%) | 11 | 0 | 11 | 8.8 | 7.1 | 0 |

TABLE 5

|  | 32 pts. by wt. | 33 pts. by wt. | 34 pts. by wt. | 35 pts. by wt. | 36 pts. by wt. |
|---|---|---|---|---|---|
| A-resin liquid | 80 | 80 | 80 | 80 | 80 |
| F-1 | 7 | 7 | 7 | 7 | 7 |
| B-1 | 6.6 | 6.6 | 6.6 | 8.1 | 8.1 |
| Benzoin | 6 | 8 | 10 | 0 | 4 |
| Total | 99.6 | 101.6 | 103.6 | 95.1 | 99.1 |
| A-resin/benzoin | 13.3 | 10.0 | 8.0 | — | 20.0 |
| Curing agent/benzoin | 1.1 | 0.8 | 0.7 | — | 2.0 |
| % by wt. of benzoin | 6.0 | 7.9 | 9.7 | — | 4.0 |
| 1 W 60° C. (%) | 0 | 0 | 0 | 20 | 3 |

TABLE 6

|  |  | 37 % by wt. | 38 % by wt. | 39 % by wt. |
|---|---|---|---|---|
| A-resin liquid |  | 46.75 | 45.78 | 44.85 |
| Reactive diluent |  | 0.53 | 0.52 | 0.51 |
| D-1 |  | 23.38 | 22.89 | 22.42 |
| B-1 |  | 3.77 | 3.69 | 3.62 |
| C-2 |  | 4.25 | 4.16 | 4.08 |
| Benzoin |  | 0.00 | 2.08 | 4.08 |
| Mixture of F1 and F3 |  | 21.32 | 20.87 | 20.45 |
| Total |  | 100.00 | 100.00 | 100.00 |
| A-resin/benzoin |  | — | 22.0 | 11.0 |
| Curing agent/benzoin |  | — | 1.8 | 0.9 |
| ZF (2 mm/min) [MPa] |  | 27.5 | 25.0 | 22.6 |
| Elongation at break [%] |  | 8.8 | 5.6 | 3.4 |
| Modulus of elasticity (0.05-0.25%)[MPa] |  | 1470 | 1490 | 1480 |
| ZSF [MPa] |  | 21.2 | 22.9 | 22.5 |
| I-Peel [N/mm] | 23° C. | 22.6 | 23.0 | 21.2 |
| I-Peel [N/mm] | −30° C. | 18.9 | 16.5 | 13.9 |
| T-Peel [N/mm] |  | 6.5 | 6.0 | 5.5 |
| Rheology, 1 d RT [Pa * s] | Viscosity 25° C. | 1320 | 1300 | 1070 |
| Rheology, 1 d RT [Pa * s] | Viscosity 50° C. | 441 | 420 | 338 |
| Rheology, 1 W 60° C. [Pa * s] | Viscosity 25° C. | 1980 (+50%) | 1730 (+33%) | 1360 (+27%) |
| Rheology, 1 W 60° C. [Pa * s] | Viscosity 50° C. | 606 (+37%) | 519 (+24%) | 374 (+11%) |

The invention claimed is:

1. A one-component thermosetting epoxy resin composition comprising:
   a) at least one epoxy resin A having an average of more than one epoxy group per molecule;
   b) at least one latent curing agent for epoxy resins B;
   c) at least one compound of the formula

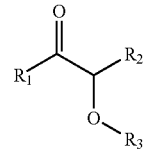

(III)

wherein:
   substituents $R_1$ and $R_2$ are independently an unsubstituted benzene, a halogenated benzene, alkoxylated benzene, an alkylated benzene or an N derivative of an aniline,
   substituent $R_3$ is H or an alkyl group having 1 to 10 carbon atoms,
   a weight ratio of the at least one epoxy resin A having an average of more than one epoxy group per molecule to the at least one compound of the formula (III) is 5-800,
   the one-component thermosetting epoxy resin composition has a viscosity at 25° C. of 500-3000 Pa*s, and
   the one-component thermosetting epoxy resin composition has a percentage rise in viscosity at 25° C. after storage for one week at 60° C. after mixing that is less than 90% of the corresponding percentage rise in viscosity of a one-component thermosetting epoxy resin composition that is the same except not having a compound of formula (III).

2. The one-component thermosetting epoxy resin composition as claimed in claim 1, wherein, in the at least one compound of the formula (III), the substituents $R_1$ and $R_2$ are independently an unsubstituted benzene; a halogenated benzene, or an alkylated benzene.

3. The one-component thermosetting epoxy resin composition as claimed in claim 1, wherein, in the at least one compound of the formula (III), the substituent $R_3$ is H or an alkyl group having 1 to 8 carbon atoms.

4. The one-component thermosetting epoxy resin composition as claimed in claim 1, wherein, in the at least one compound of the formula (III), the substituents $R_1$ and $R_2$ are each unsubstituted benzene and the substituent $R_3$ is H or an alkyl group having 1 to 4 carbon atoms.

5. The one-component thermosetting epoxy resin composition as claimed in claim 1, wherein the weight ratio of the at least one epoxy resin A having an average of more than one epoxy group per molecule to the at least one compound of the formula (III) is 10-600.

6. The one-component thermosetting epoxy resin composition as claimed in claim 1, wherein a weight ratio of the at least one latent curing agent for epoxy resins B to the at least one compound of the formula (III) is 0.5-8.

7. The one-component thermosetting epoxy resin composition as claimed in claim 1, wherein a proportion of the at least one compound of the formula (III) is 0.1% by weight-15% by weight, based on a total weight of the one-component thermosetting epoxy resin composition.

8. The one-component thermosetting epoxy resin composition as claimed in claim 1, wherein the latent curing agent for epoxy resins B is selected from the group consisting of dicyandiamide, guanamines, guanidines, anhydrides of polybasic carboxylic acids, dihydrazides, and aminoguanidines.

9. The one-component thermosetting epoxy resin composition as claimed in claim 1, wherein the thermosetting epoxy resin composition additionally includes at least one accelerator C selected from the group consisting of substituted ureas, imidazoles, imidazolines and blocked amines.

10. The one-component thermosetting epoxy resin composition as claimed in claim 9, wherein the latent curing agent B is a guanidine, and the accelerator C for epoxy resins is selected from the group consisting of substituted ureas and blocked amines.

11. The one-component thermosetting epoxy resin composition as claimed in claim 1, wherein the thermosetting epoxy resin composition additionally includes at least one toughness improver D selected from the group consisting of terminally blocked polyurethane polymers D1, liquid rubbers D2 and core-shell polymers D3.

12. A motor vehicle construction or sandwich panel construction, comprising the one-component thermosetting epoxy resin composition as claimed in claim 1 after heat curing to form an adhesive.

13. A method of bonding thermally stable substrates, comprising the steps of
i) applying the one-component thermosetting epoxy resin composition as claimed in claim 1 to a surface of a thermally stable substrate S1;
ii) contacting the one-component thermosetting epoxy resin composition applied with a surface of a further thermally stable substrate S2; and
iii) heating the one-component thermally epoxy resin composition to a temperature of 100-220° C.,
wherein the substrate S2 consists of the same material or a different material than the substrate S1.

14. A bonded article obtained from the method as claimed in claim 13.

* * * * *